United States Patent
Chaffey et al.

(10) Patent No.: US 10,703,899 B2
(45) Date of Patent: Jul. 7, 2020

(54) ABLATIVE MATERIAL WITH A POLYMERIC PHOSPHORYLATED AMIDE

(71) Applicant: The Boeing Company, Chicago, IL (US)

(72) Inventors: Michele L. Chaffey, Garden Grove, CA (US); Arthur Rojo, Cypress, CA (US)

(73) Assignee: The Boeing Company, Chicago, IL (US)

(*) Notice: Subject to any disclaimer, the term of this patent is extended or adjusted under 35 U.S.C. 154(b) by 155 days.

(21) Appl. No.: 15/446,844

(22) Filed: Mar. 1, 2017

(65) Prior Publication Data
US 2018/0251632 A1    Sep. 6, 2018

(51) Int. Cl.
| | |
|---|---|
| C08K 5/49 | (2006.01) |
| C08L 61/06 | (2006.01) |
| B64G 1/58 | (2006.01) |
| C08L 61/04 | (2006.01) |
| B29C 67/24 | (2006.01) |
| B32B 17/10 | (2006.01) |
| B32B 27/08 | (2006.01) |
| B32B 27/20 | (2006.01) |
| B32B 27/34 | (2006.01) |
| B32B 27/42 | (2006.01) |
| B29K 61/04 | (2006.01) |

(52) U.S. Cl.
CPC .............. *C08L 61/06* (2013.01); *B29C 67/24* (2013.01); *B32B 17/10724* (2013.01); *B32B 27/08* (2013.01); *B32B 27/20* (2013.01); *B32B 27/34* (2013.01); *B32B 27/42* (2013.01); *B64G 1/58* (2013.01); *C08L 61/04* (2013.01); *B29K 2061/04* (2013.01); *B32B 2262/106* (2013.01); *B32B 2262/108* (2013.01); *B32B 2264/0214* (2013.01); *B32B 2264/102* (2013.01); *B32B 2307/306* (2013.01); *B32B 2571/00* (2013.01); *B32B 2605/18* (2013.01)

(58) Field of Classification Search
CPC . B32B 2307/306; B32B 2605/18; B64G 1/58; C08L 79/08; C08G 79/02; C08G 73/1057
See application file for complete search history.

(56) References Cited

U.S. PATENT DOCUMENTS

| | | | | |
|---|---|---|---|---|
| 3,913,625 A | * | 10/1975 | Gazda | B29C 47/021 138/127 |
| 4,364,991 A | * | 12/1982 | Byrd | C08K 5/49 427/385.5 |
| 4,403,075 A | * | 9/1983 | Byrd | C08G 79/02 428/426 |
| 4,582,932 A | * | 4/1986 | Byrd | C08G 73/10 423/302 |

(Continued)

OTHER PUBLICATIONS

Extended European Search Report, dated Jun. 14, 2018, regarding Application No. EP17204430.7, 7 pages.

*Primary Examiner* — Michael A Salvitti
(74) *Attorney, Agent, or Firm* — Yee & Associates, P.C.

(57) ABSTRACT

An ablative material comprises a phenolic resin, a polymeric phosphorylated amide, and a number of fillers. The polymeric phosphorylated amide is in the ratio of between 1 and 10 parts of the polymeric phosphorylated amide per 100 parts of phenolic resin or resin solids, by weight.

20 Claims, 3 Drawing Sheets

(56) References Cited

U.S. PATENT DOCUMENTS

| | | | | |
|---|---|---|---|---|
| 4,739,115 A | * | 4/1988 | Byrd | C08G 73/10 428/325 |
| 7,956,149 B1 | * | 6/2011 | Byrd | C08G 77/388 442/302 |
| 7,959,783 B2 | * | 6/2011 | Byrd | C25D 9/02 205/316 |
| 8,206,546 B2 | * | 6/2012 | Tompkins | B29C 43/18 156/155 |
| 8,349,223 B1 | * | 1/2013 | Byrd | C07F 9/4496 252/601 |
| 9,103,047 B2 | * | 8/2015 | Byrd | C25D 9/02 |
| 2005/0161337 A1 | * | 7/2005 | Byrd | C25D 9/02 205/159 |
| 2009/0311468 A1 | * | 12/2009 | Thatcher | B29C 43/14 428/116 |
| 2009/0311471 A1 | * | 12/2009 | Tompkins | B29C 43/18 428/117 |
| 2011/0266153 A1 | * | 11/2011 | Byrd | C25D 9/02 205/50 |
| 2018/0251632 A1 | * | 9/2018 | Chaffey | B64G 1/58 |

\* cited by examiner

ABLATIVE MATERIAL WITH A POLYMERIC PHOSPHORYLATED AMIDE

BACKGROUND INFORMATION

1. Field

The present disclosure relates generally to ablative materials. More specifically, the present disclosure relates to ablative materials including a polymeric phosphorylated amide.

2. Background

Ablative materials protect structures from excessive heat by sacrificing portions of the material. Ablative materials are used in heat shields of atmospheric entry vehicles, such as lunar or planetary return vehicles, and may be used in any structure exposed to large amounts of heat.

Existing mid-heat flux (400 W/cm$^2$-1500 W/cm$^2$) ablative materials are stiff and have low strain capabilities. The material properties of existing mid-heat flux ablative materials may result in undesirable performance conditions during deflections of a vehicle or other structure.

Existing higher flexibility ablators provide lower levels of thermal protection than conventional mid-heat flux ablative materials. Desirable levels of thermal protection may not be possible with existing higher flexibility ablative materials.

Stiff vehicle structures or strain isolation pads may be used to prevent flexing of the ablative materials. However, stiff vehicle structures add extra vehicle weight. Strain isolation pads also add significant extra cost and may complicate installation of the ablative material.

Therefore, it would be desirable to have a method and apparatus that takes into account at least some of the issues discussed above, as well as other possible issues. For example, it would be desirable to have an ablative material with both desirable levels of thermal protection and a desirable stiffness.

SUMMARY

An illustrative embodiment of the present disclosure provides an ablative material. The ablative material comprises a phenolic resin, a polymeric phosphorylated amide, and a number of fillers. The polymeric phosphorylated amide is in the ratio of between 1 and 10 parts of the polymeric phosphorylated amide per 100 parts of phenolic resin or resin solids, by weight.

Another illustrative embodiment of the present disclosure provides a structure comprising an ablative material cured into a desired shape. The ablative material comprises a resol phenolic resin, a polymeric phosphorylated amide in the ratio of between 1 and 10 parts of the polymeric phosphorylated amide per 100 parts of phenolic resin or resin solids, by weight, and a number of fillers including a number of density fillers and a number of structural reinforcement fillers.

A further illustrative embodiment of the present disclosure provides a method. A phenolic resin is added to a mixer. Between 1 and 10 parts of a polymeric phosphorylated amide per 100 parts of phenolic resin or resin solids, by weight, is added to the mixer. The phenolic resin and polymeric phosphorylated amide are mixed for at least 5 minutes. A number of fillers is added to the mixer. The number of fillers, polymeric phosphorylated amide, and phenolic resin are mixed to form an ablative material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
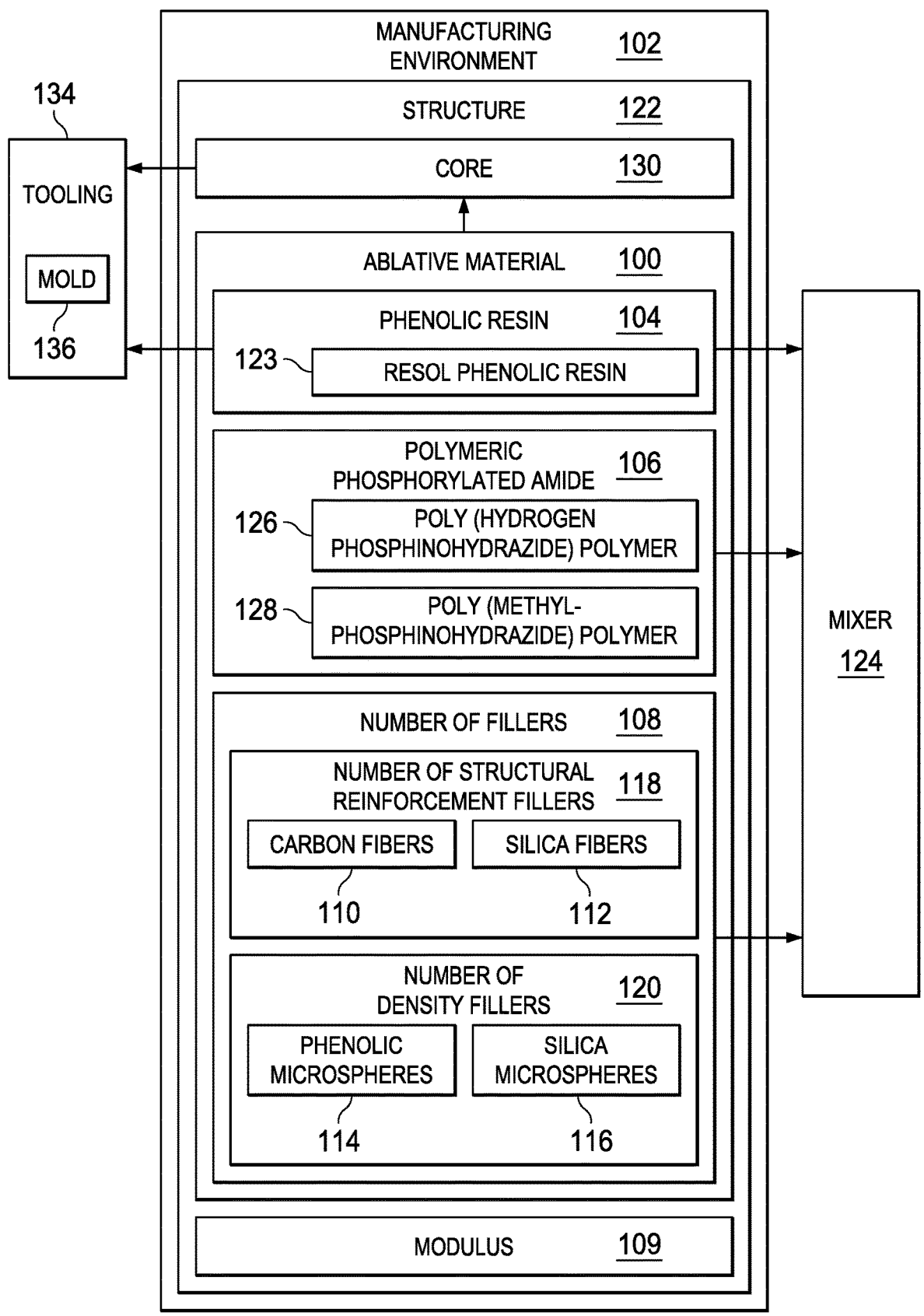
FIG. 1 is an illustration of a block diagram of a manufacturing environment in accordance with an illustrative embodiment.

The illustrative embodiments recognize and take into account one or more different considerations. For example, the illustrative embodiments recognize and take into account that material additives may affect multiple material properties of a mixture. The illustrative embodiments recognize and take into account that it would be desirable to have an additive for ablative materials that maintains the heat protective properties of the ablative material while lowering the stiffness.

The illustrative embodiments also recognize and take into account that an additive desirably mixes homogenously into the ablative material. Yet further, the illustrative embodiments recognize and take into account that an additive desirably does not separate out following mixing.

The illustrative embodiments also recognize and take into account that composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

The illustrative embodiments recognize and take into account that different forms of composite materials use different processing techniques. For example, in some illustrative examples, a resin may be impregnated into a cloth or wetted onto long fibers to form a composite material. When these composite materials are laid down onto a tool prior to curing, the composite materials may be referred to as "prepreg," or preimpregnated composite materials. Prepreg materials are primarily unidirectional. Unidirectional composite materials have fibers pointed in one direction.

Another form of composite material is a bulk resin with filler fibers mixed into the resin. The filler fibers may be shorter than the fibers of a prepreg. Due to the mixing process, the filler fibers are not unidirectional. The resulting composite material may be molded by any desirable method.

The illustrative embodiments recognize and take into account that material properties and the functionality of composite parts are affected by many factors. The illustrative embodiments recognize and take into account that the contents of the composite material, as well as the processing of the composite material, affects the material properties of the composite material. For example, the type of resin, the type of fibers, the length of fibers, the direction of fibers, the types of additives, the length of cure, the temperature of cure, and the pressure applied during cure may all affect the material properties of a composite material. Further, the thickness of the composite material part, the shape of the composite material part, and the direction of the forces applied to the part in relation to the direction of the fibers all affect how a composite part will behave.

The illustrative embodiments recognize and take into account that material properties of composite materials are determined through testing the manufactured composite parts. The illustrative embodiments recognize and take into account that due to the chemical and mechanical interactions of components of composite materials, effects of additives to phenolic ablative materials are determined through repeated testing.

With reference now to the figures, and in particular, with reference to FIG. 1, an illustration of a block diagram of a manufacturing environment is depicted in accordance with an illustrative embodiment. Ablative material 100 may be at least one of created or processed in manufacturing environment 102.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Ablative material 100 comprises phenolic resin 104, polymeric phosphorylated amide 106, and number of fillers 108. As used herein, "a number of" when used with reference to items means one or more items. Thus, number of fillers 108 includes one or more fillers.

Polymeric phosphorylated amide 106 is in the ratio of between 1 and 10 parts of polymeric phosphorylated amide 106 per 100 parts of phenolic resin 104 or resin solids, by weight. Mixing polymeric phosphorylated amide 106 into phenolic resin 104 in the designated proportions causes polymeric phosphorylated amide 106 to link up with some parts of phenolic resin 104 to impart a decrease in modulus 109. As depicted, number of fillers 108 includes at least one of carbon fibers 110, silica fibers 112, phenolic microspheres 114, or silica microspheres 116.

Number of fillers 108 is used to provide material characteristics to ablative material 100. Number of fillers 108 includes number of structural reinforcement fillers 118 and number of density fillers 120. Number of structural reinforcement fillers 118 provide structural reinforcement to ablative material 100. Both silica fibers 112 and carbon fibers 110 provide structural reinforcement to ablative material 100. Accordingly, silica fibers 112 and carbon fibers 110 may be referred to as structural reinforcement fillers.

Ablative material 100 is used to form structure 122. When structure 122 is used in an aircraft, spacecraft, or other platform having weight considerations, the density of structure 122 may be desirably lowered. Number of density fillers 120 may be used to reduce the density of ablative material 100. Silica microspheres 116 and phenolic microspheres 114 are used as density reducing fillers.

Number of fillers 108 are selected such that desirable material properties of phenolic resin 104 are not significantly diminished. For example, number of fillers 108 may be selected to enhance ablative properties of phenolic resin 104. Silica fibers 112 and carbon fibers 110 enhance the thermal and ablative performance. Silica microspheres 116 and phenolic microspheres 114 also enhance the thermal and ablative performance of ablative material 100.

Sizes and materials of number of fillers 108 are selected to provide desirable material properties for ablative material 100. In one illustrative example, silica fibers 112 may have a diameter of about 1.19 µm-1.75 µm. In one illustrative example, carbon fibers 110 may be milled fibers having a length of about 150 µm and a diameter of about 7-9 µm. Silica microspheres 116 may have a diameter of between about 20-250 µm. Phenolic microspheres 114 may have a most common diameter of between about 20-100 µm. However, provided measurements are only illustrative examples. Sizes and materials of number of fillers 108 may be selected to suit the needs of a particular application.

Phenolic resin 104 is selected based on at least one of desirable material properties or manufacturing considerations. Desirable material properties refer to properties such as stiffness, heat resistance, strength, or any other properties of phenolic resin 104. Desirable material properties may be selected based on the performance expectations of structure 122.

Desirable manufacturing considerations may include any factors for manufacturing. For example, manufacturing considerations for phenolic resin 104 include any number of quantity of components, curing temperatures, toxicity, handling temperature or handling time, or required additives for processing. Additives for processing may also affect the material properties of phenolic resin 104. For example, phenolic resin 104 may have better thermodynamic response characteristics when additives, such as curing agents, diluents, or solvents are not present.

In some illustrative examples, phenolic resin 104 is resol phenolic resin 123. In one specific example, phenolic resin 104 is Plenco 11956 resin. Plenco 11956 resin is water-based and a single component. Plenco 11956 resin does not require additional additives such as solvents, curing agents, or diluents for processing. Additionally, Plenco 11956 resin is mixed at room temperature without heating.

In another specific example, phenolic resin 104 is Hexion SC1008 VHS. Hexion SC1008 VHS is isopropyl alcohol-based and a single component. Hexion SC1008 VHS does not require additional additives such as solvents, curing agents, or diluents for processing. Additionally, Hexion SC1008 VHS is mixed at room temperature without heating. VHS is an acronym for very high solids. Hexion SC1008 VHS also has a high solids content. More specifically, Hexion SC1008 VHS has a solids content in the range of 50% to 80% by weight.

Ablative material 100 may have a longer room temperature working life when a curing agent is not present. A longer working life will allow for structure 122 to be a large monolithic structure, such as a heat shield.

The mixing of the components to form ablative material 100 is done in mixer 124 that imparts high shear forces to the mixture but does not chop or mill the fibers and microspheres. In some illustrative examples, mixer 124 may be a commercial bread mixer. Phenolic resin 104 is added to mixer 124 first.

When forming ablative material 100, the components may be added in a desired order. The desired order may be selected to achieve uniform wetting and consistency of the components of ablative material 100. The desired order may be selected to achieve uniform blending and avoid clumping. In one illustrative example, polymeric phosphorylated amide 106 is added to phenolic resin 104 prior to adding number of fillers 108. By adding polymeric phosphorylated amide 106 first, polymeric phosphorylated amide 106 may desirably bond to phenolic resin 104.

In this illustrative example, after adding polymeric phosphorylated amide 106, number of fillers 108 is added to the combination. In some illustrative examples, number of fillers 108 has a desirable order of addition. The desirable order of addition is selected to provide uniform wetting and consistency after mixing.

In one illustrative example, silica fibers 112 are added to the mixture first, followed by carbon fibers 110, silica microspheres 116, and phenolic microspheres 114. After each addition, mixing is performed. In some examples, mixing is performed after each addition. After adding all of silica fibers 112, carbon fibers 110, silica microspheres 116, and phenolic microspheres 114, ablative material 100 is mixed to achieve uniform dispersion and wetting by phenolic resin 104.

In some illustrative examples, polymeric phosphorylated amide 106 is poly (hydrogen phophinohydrazide) polymer 126. Poly (hydrogen phophinohydrazide) may be referred to as H-PPA. In some illustrative examples, polymeric phosphorylated amide 106 is poly (methyl-phosphinohydrazide) polymer 128. Poly (methyl-phosphinohydrazide) polymer 128 may be referred to as M-PPA.

Structure 122 comprises ablative material 100 cured into a desired shape. Ablative material 100 comprises resol phenolic resin 123; polymeric phosphorylated amide 106 in the ratio of between 1 and 10 parts of polymeric phosphorylated amide 106 per 100 parts of phenolic resin or resin solids, by weight; and number of fillers 108 including number of density fillers 120 and number of structural reinforcement fillers 118.

In some illustrative examples, number of structural reinforcement fillers 118 is selected from carbon fibers 110 and silica fibers 112. In some illustrative examples, number of density fillers 120 is selected from phenolic microspheres 114 and silica microspheres 116. In some illustrative examples, resol phenolic resin 123 is one of Plenco 11956 resin or Hexion SC1008 VHS.

To form structure 122, ablative material 100 is shaped and cured. Ablative material 100 is shaped through any desirable molding process.

In some illustrative examples, structure 122 further comprises core 130, wherein ablative material 100 is adhered to core 130 by co-curing. When co-curing is used, ablative material 100 and core 130 are both placed into the same mold. In co-curing, ablative material 100 and core 130 are subjected to the same curing temperatures and pressures together.

Ablative material 100 may be incorporated into core 130. For example, core 130 may be a glass-phenolic reinforcement core which has been treated with a coupling agent, such as ethylene diamine, to promote adhesion of ablative material 100 to core 130.

Any desirable type of tooling 134 may be used to shape ablative material 100. When structure 122 is a heat shield for a spacecraft, tooling 134 may comprise a 3 to 5 inch high frame of up to approximately 5 ft² in area, used to shape ablative material 100. If core 130 is used, it is placed inside tooling 134 before introduction of ablative material 100.

In some illustrative examples, tooling 134 comprises mold 136. To form structure 122, ablative material 100 is added into mold 136 and ablative material 100 is cured. When core 130 is present in structure 122, core 130 is added to mold 136 and curing ablative material 100 comprises curing ablative material 100 to bond ablative material 100 to core 130.

Ablative material 100 has a dough-like consistency. Due to the consistency, ablative material 100 may be broken up into discrete 0.5 inch to 1.0 inch clumps. In some illustrative examples, ablative material 100 may be broken using a screen. The clumps are then sprinkled into tooling 134 (and core 130 if present) to fill tooling 134 and at least one inch above core 130, if present. Ablative material 100 is pressed down with a flat tool if it protrudes above tooling 134. When pressed, the top of ablative material 100 is scored to promote adhesion before additional ablative material 100 is sprinkled on top.

In some illustrative examples, ablative material 100 is kitted and mixed in batches sufficient for the size of tooling 134 used such that the entire batch is sprinkled into tooling 134. Caul plates are placed over ablative material 100 to provide desirable external surface properties for structure 122. The shape and material of the caul plates are selected based on structure 122 and ablative material 100.

When structure 122 is a heat shield for a spacecraft, Armalon, rubber and/or aluminum honeycomb caul plates are placed over ablative material 100 which are covered with fluorinated ethylene propylene (FEP), Kapton, or other appropriate polymeric sheet material to contain phenolic resin 104 during curing.

Tooling 134 is then covered with breather and vacuum bag materials and cured to a green state in an autoclave with a slow ramp to a desired first temperature for the selected resin and stepped pressure of 30-60 psi then 60-125 psi. Following autoclave curing, caul plates, and coverings are removed, and ablative material 100 is removed from tooling 134, and placed in a fresh vacuum bag with breather. The panel is placed into an oven for a second stage cure. The second stage cure is performed at a second desirable temperature for the selected resin. In some examples, the second desirable temperature is higher than the desired first temperature.

In some illustrative examples, the desired first temperature is in the range of 200° F. to 260° F. In some illustrative examples, the second desirable temperature is in the range of 260° F. to 330° F.

The specific temperatures for curing are chosen on the desirable performance and material characteristics of ablative material 100. Further, the specific temperatures for curing are chosen based on the type of phenolic resin 104.

In some examples, ablative material 100 may be cured directly onto the carrier structure of a vehicle. In these examples, core 130, if used, is first bonded to the carrier structure with a film adhesive before tooling 134 is placed around it and ablative material 100 is incorporated. Structure 122 then undergoes non-destructive evaluation and is machined to final shape.

In some illustrative examples, rather than curing ablative material 100 directly onto the carrier structure, ablative material 100 may be cured in separate blocks of material.

Structure 122 may be one of these blocks of material. Each of the blocks of material, such as structure 122, is machined to a desired shape and size, and bonded on to the carrier structure with an appropriate high temperature adhesive or an epoxy. When present, core 130 provides reinforcement to ablative material 100. Core 130 is optional. In some illustrative examples, structure 122 is formed of ablative material 100 without core 130. When core 130 is not present, ablative material 100 may be molded without reinforcement.

Figure 2:
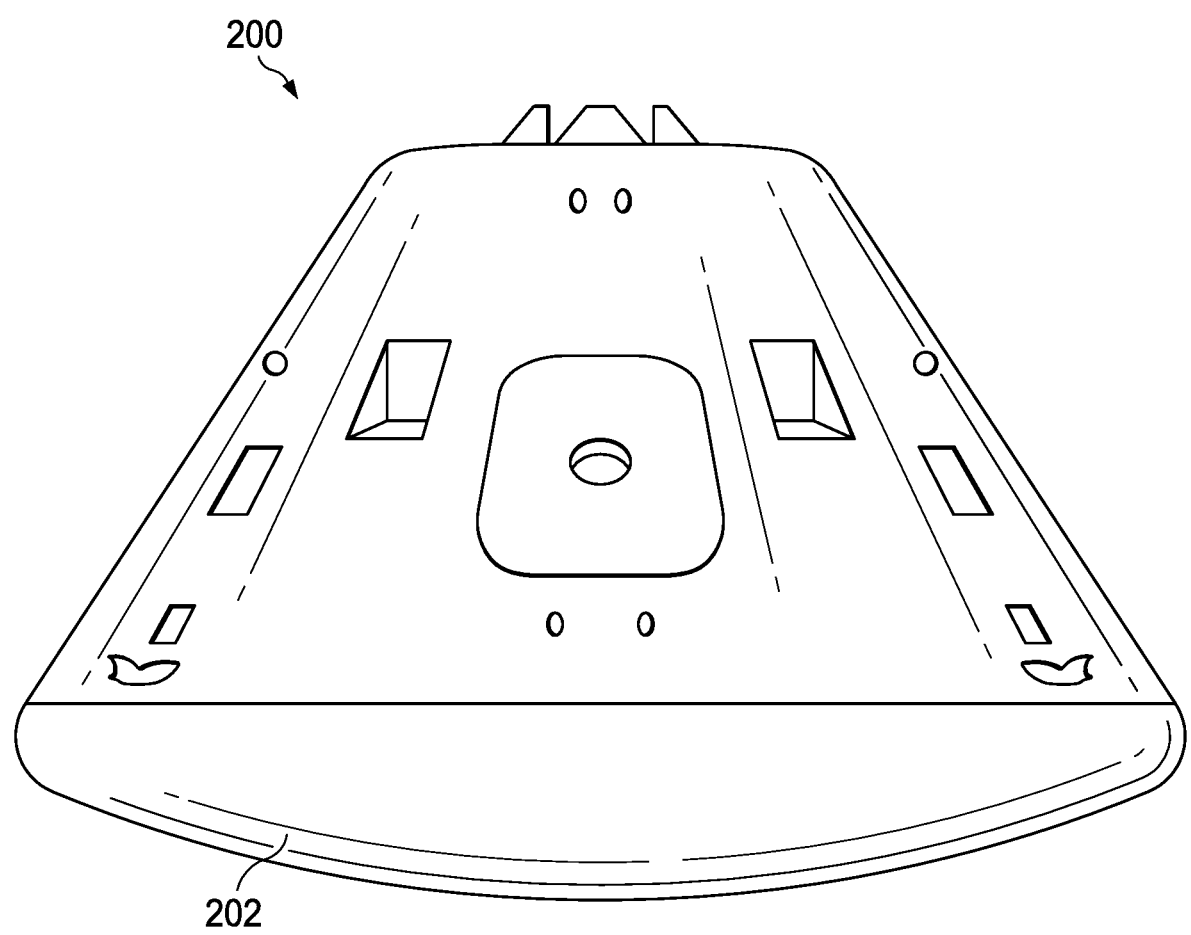
FIG. 2 is an illustration of a space craft in which an illustrative embodiment may be implemented.

Turning now to FIG. 2, an illustration of a spacecraft in which an illustrative embodiment may be implemented is depicted. Spacecraft 200 includes heat shield 202. Heat shield 202 protects spacecraft 200 and any cargo or occupants from heat during entry into a planet's atmosphere. Heat shield 202 is one physical implementation of structure 122 of FIG. 1. Heat shield 202 includes an ablative material, such as ablative material 100 of FIG. 1.

Spacecraft 200 and heat shield 202 are only one physical implementation of a spacecraft and heat shield. Spacecraft 200 may have any desirable design. Heat shield 202 may have any desirable design and shape.

Spacecraft 200 is only one physical implementation of a platform incorporating ablative material 100 of FIG. 1. Although the illustrative examples for an illustrative embodiment are described with respect to a spacecraft, an illustrative embodiment may be applied to other types of platforms. Ablative material 100 may be used in any desirable platform encountering high temperatures. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 2 may be combined with components in FIG. 1, used with components in FIG. 1, or a combination of the two. Additionally, some of the components in FIG. 2 may be illustrative examples of how components shown in block form in FIG. 1 may be implemented as physical structures.

Figure 3:
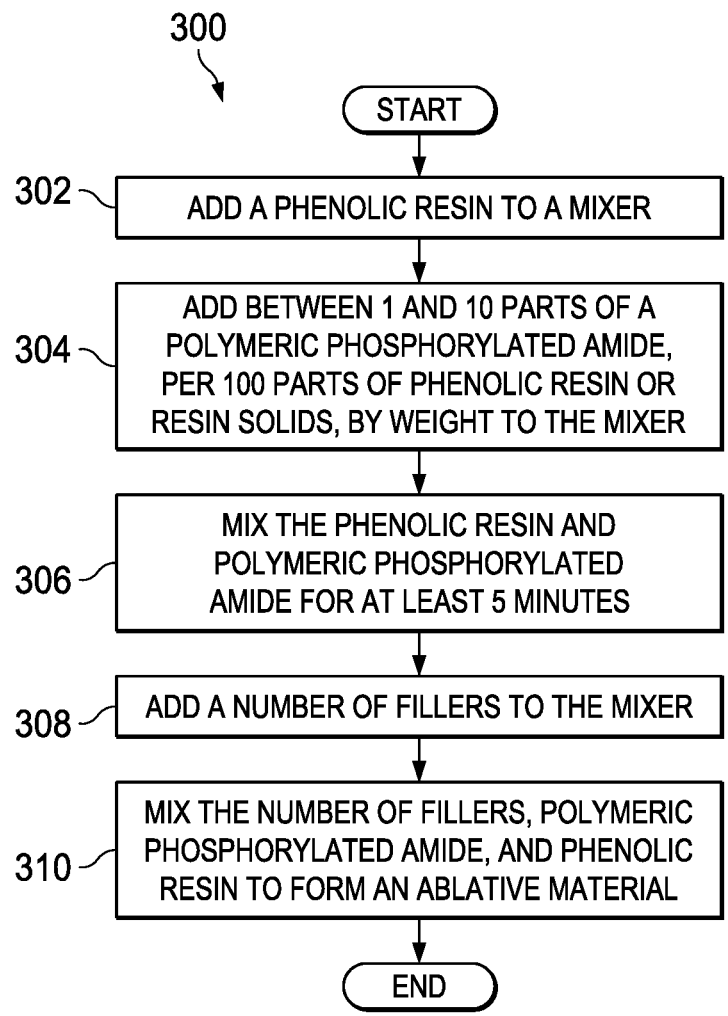
FIG. 3 is an illustration of a flowchart of a method for forming an ablative material in accordance with an illustrative embodiment.

Turning now to FIG. 3, an illustration of a flowchart of a method for forming an ablative material is depicted in accordance with an illustrative embodiment. Method 300 may be used to form ablative material 100 of FIG. 1. Method 300 may be used to form an ablative material used to form heat shield 202 of FIG. 2.

Method 300 adds a phenolic resin to a mixer (operation 302). In some illustrative examples, the phenolic resin is a resol phenolic resin. In some illustrative examples, the phenolic resin is Hexion SC1008 VHS.

Method 300 adds between 1 and 10 parts of a polymeric phosphorylated amide, per 100 parts of phenolic resin or resin solids, by weight to the mixer (operation 304). In some illustrative examples, the polymeric phosphorylated amide is one of a poly (methyl-phosphinohydrazide) polymer or a poly (hydrogen phosphinohydrazide) polymer. Method 300 mixes the phenolic resin and polymeric phosphorylated amide for at least 5 minutes (operation 306).

Method 300 adds a number of fillers to the mixer (operation 308). In some illustrative examples, the number of fillers includes at least one of carbon fibers, silica fibers, phenolic microspheres, or silica microspheres. Method 300 mixes the number of fillers, polymeric phosphorylated amide, and phenolic resin to form an ablative material (operation 310). Afterwards the method terminates.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

For example, method 300 may further comprise manufacturing the ablative material into a preform. As another example, method 300 may further comprise adding the ablative material into a mold and curing the ablative material. In some illustrative examples, method 300 also includes adding a core into the mold, wherein curing the ablative material comprises curing the ablative material to bond the ablative material to the core.

Method 300 may be described as a method of increasing strain compliance of an ablative material. Method 300 increases the strain compliance of a known ablative material by adding a polymeric phosphorylated amide to the previous composition of the ablative material. Because the ablative material is formed of a phenolic resin, method 300 may be described as a method of increasing strain compliance of a phenolic ablator.

An ablative thermal protection material formulation and method of processing has been developed which allows the ablative material to have improved properties such as increased strain compliance, reduced modulus, decreased density, and improved char stability over the existing material for a capsule or probe base heat shield.

The addition of a polymeric phosphorylated amide to a phenolic resin-based ablative improves the mechanical and thermal properties over existing formulations due to chemical links in the phenol chains. The illustrative examples result in a mid-range heat flux (400 $W/cm^2$-1500 $W/cm^2$) capable ablative thermal protection material with a reduced modulus. The reduced modulus mitigates the formation of stress-induced cracks in the ablative material.

The ablative material also has a decreased density which reduces the weight added to a vehicle or other platform. The ablative material also has improved char stability which results in less transfer of heat through the ablative material and an extension of the time that the ablative material can be exposed to heat/re-entry conditions. Because the ablative material has a higher char stability and lower density, there is less added weight to the vehicle to achieve the same thermal protection over existing ablative materials.

The illustrative processes detail the fabrication of a phenolic ablative material which includes a poly (methyl-phosphinohydrazide) polymer additive to increase strain compliance and reduce modulus, allowing the material to withstand structural deflections of a spacecraft heat shield. The formulation includes 1 to 10 parts, per 100 parts of phenolic resin or resin solids, by weight. The additive is incorporated into the resin using a commercial bread mixer that imparts high shear forces to the blend but does not chop or mill fibers and microspheres. The two liquids should be mixed for a minimum of five minutes. Once the poly (methyl-phosphinohydrazide) is incorporated into the resin, the fillers of the ablative material are mixed into the liquid.

The completed ablative material can be incorporated into a glass-phenolic reinforcement core which has been treated with a coupling agent, such as ethylene diamine, to promote adhesion of the ablative material to the core, or it may be molded without reinforcement. Tooling, comprised of a 3-5 inch high frame of up to approximately 5 ft² in area, is used to mold the ablative material. If a core is used, it is placed inside the tooling before introduction of the ablative material. The dough-consistency ablative material is broken up into discrete 0.5 inch to 1.0 inch clumps usually using a screen. The clumps are then sprinkled into the tool (and core if present) to fill the tool, and at least one inch above the core if present. The material is pressed down with a flat tool if it protrudes above the tool. The top of the pressed material is scored to promote adhesion before additional material is sprinkled on top of it. The material is kitted and mixed in batches sufficient for the size tool used such that then entire batch is sprinkled into the tool. Armalon, rubber and/or aluminum honeycomb caul plates are placed over the material which are covered with fluorinated ethylene propylene (FEP), Kapton, or other appropriate polymeric sheet material to contain resin during curing. The tool is then covered with standard breather and vacuum bag materials and cured to a green state in an autoclave with a slow ramp to a maximum temperature and a stepped pressure of pressure of 30-60 psi then 60-125 psi. The maximum temperature is selected based on the selected resin. Following autoclave curing, caul plates, and coverings are removed, and the material is removed from the tooling, and placed in a fresh vacuum bag with breather. The panel is placed into an oven for a second stage cure. In some examples, the second stage cure is at a temperature greater than the autoclave curing. The second state cure is performed until a desired level of cure is obtained in the ablative material. In some illustrative examples, a level of cure may be determined based on hardness and strength data.

The ablative may be cured directly onto the carrier structure of a vehicle, in which case the reinforcement core, if used, is first bonded to the carrier structure with a film adhesive, such as HT-424, before the tooling is placed around it and the ablative incorporated. The heat shield then undergoes non-destructive evaluation and is machined to final shape. Alternately, the material may be cured in separate blocks of material, machined to desired shape and size, and bonded on to the carrier structure with an appropriate high temperature adhesive, such as a room temperature curing vulcanized rubber (RTV-560) or an epoxy.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
adding a phenolic resin to a mixer;
adding between 1 part and 4.9 parts of a polymeric phosphorylated amide, per 100 parts of the phenolic resin, by weight to the mixer;
mixing the phenolic resin and the polymeric phosphorylated amide for at least 5 minutes;
adding a number of fillers to the mixer after mixing the phenolic resin and the polymeric phosphorylated amide for at least 5 minutes; and
mixing the number of fillers, the polymeric phosphorylated amide, and the phenolic resin to form an ablative material.

2. The method of claim 1, wherein the phenolic resin is a resol phenolic resin.

3. The method of claim 1, wherein the polymeric phosphorylated amide is at least one of a poly (methyl-phosphinohydrazide) polymer or a poly (hydrogen phosphinohydrazide) polymer.

4. The method of claim 1, wherein the number of fillers includes at least one of carbon fibers, silica fibers, phenolic microspheres, or silica microspheres.

5. The method of claim 2, wherein adding the phenolic resin to the mixer comprises:
adding the phenolic resin to the mixer such than no additional additive is added to the mixer.

6. The method of claim 1, wherein the phenolic resin and the polymeric phosphorylated amide are mixed at room temperature without heating.

7. A method comprising:
adding a phenolic resin to a mixer;
adding between 1 part and 4.9 parts of a polymeric phosphorylated amide, per 100 parts of the phenolic resin, by weight in the mixer;
mixing the phenolic resin and the polymeric phosphorylated amide for at least 5 minutes;
adding a number of fillers to the mixer after mixing the phenolic resin and the polymeric phosphorylated amide for at least 5 minutes;
mixing the number of fillers, the polymeric phosphorylated amide, and the phenolic resin to form an ablative material; and
manufacturing the ablative material into a preform.

8. A method comprising:
adding a phenolic resin to a mixer;
adding between 1 part and 4.9 parts of a polymeric phosphorylated amide, per 100 parts of the phenolic resin, by weight in the mixer;
mixing the phenolic resin and the polymeric phosphorylated amide for at least 5 minutes;
adding a number of fillers to the mixer after mixing the phenolic resin and the polymeric phosphorylated amide for at least 5 minutes;
mixing the number of fillers, the polymeric phosphorylated amide, and the phenolic resin to form an ablative material, wherein incorporation of the polymeric phosphorylated amide:
increases strain compliance of the ablative material; and
decreases modulus of the ablative material;
disposing the ablative material in a mold; and
curing the ablative material in the mold.

9. The method of claim 8 further comprising:
adding a core into the mold, wherein curing the ablative material comprises curing the ablative material to bond the ablative material to the core.

10. The method of claim 5, wherein the additional additive not added to the mixer is at least one of a solvent, a curing agent, or a diluent.

11. The method of claim 7, wherein the phenolic resin is a resol phenolic resin.

12. The method of claim 7, wherein the polymeric phosphorylated amide is at least one of a poly (methyl-phosphinohydrazide) polymer or a poly (hydrogen phosphinohydrazide) polymer.

13. The method of claim 7, wherein the number of fillers includes at least one of carbon fibers, silica fibers, phenolic microspheres, or silica microspheres.

14. The method of claim 11, wherein adding the phenolic resin to the mixer comprises:
adding the phenolic resin to the mixer such than no additional additive is added to the mixer.

15. The method of claim 7, wherein the phenolic resin and the polymeric phosphorylated amide are mixed at room temperature without heating.

16. The method of claim 8, wherein the phenolic resin is a resol phenolic resin.

17. The method of claim 8, wherein the polymeric phosphorylated amide is at least one of a poly (methyl-phosphinohydrazide) polymer or a poly (hydrogen phosphinohydrazide) polymer.

18. The method of claim 8, wherein the number of fillers includes at least one of carbon fibers, silica fibers, phenolic microspheres, or silica microspheres.

19. The method of claim 16, wherein adding the phenolic resin to the mixer comprises:
adding the phenolic resin to the mixer such than no additional additive is added to the mixer.

20. The method of claim 8, wherein the phenolic resin and the polymeric phosphorylated amide are mixed at room temperature without heating.

* * * * *